May 22, 1956 F. O. HESS 2,746,607

POROUS MEMBRANE

Filed May 16, 1952

INVENTOR.
FREDERIC O. HESS
BY *E. Wellford Mason*
ATTORNEY.

United States Patent Office 2,746,607
Patented May 22, 1956

2,746,607
POROUS MEMBRANE

Frederic O. Hess, Philadelphia, Pa., assignor to Selas Corporation of America, Philadelphia, Pa., a corporation of Pennsylvania Application May 16, 1952, Serial No. 288,220

2 Claims. (Cl. 210—169)

The present invention relates to fluid separation, and more particularly to a self-sustaining unit that can be used as a combined filter and coalescing element or as a separating element.

When a mixture of immiscible liquids are separated, they are passed first through a coalescing membrane to coalesce droplets of the dispersed phase of the mixture in the continous phase thereof. The liquids, which ordinarily are of different specific gravities, will then begin to separate by the action of gravity. In order to speed up the process and insure complete separation, it is frequently desirable to pass one or both of the liquids through a separating membrane that has been treated to pass one of the liquids and repel the other. Thus, a clean separation of the liquids can be obtained.

In previous separators, the coalescing and separating membranes have been made of a material such as fiber or cloth that would collapse as a result of the action of the liquid against it. Consequently it has been necessary to provide a rigid support as part of the structure of the separator upon which the membranes could be mounted. This construction not only required extra labor and parts, but also created small crevices in which dirt or sediment could collect.

It is an object of the present invention to provide a membrane unit that is self supporting and which may be attached directly to the separator without the use of additional supports.

It is a further object of the invention to provide a membrane unit that includes a rigid supporting member of mesh construction which is operative to hold the membrane in position.

It is a further object of the invention to provide a chemically inert membrane unit that can be used in a fluid separation apparatus as a filter and coalescing or separating element.

According to the present disclosure, there is provided a mat of fibrous material, preferably glass wool, that is sandwiched between layers of coarse mesh glass or other fabric of inert material. The fabric is impregnated with a thermo-setting resin and cured. Thus, the fabric acts as a substantially rigid support for the fibrous material. Generally, the "sandwich" will be cylindrical or oval in shape and will have its ends closed. One or more inlets will be provided extending into the interior of the unit through which the liquid to be treated is introduced. Another form that the invention can take includes a membrane of fine mesh fabric, suitably treated for its purpose, that is supported by a coarse mesh fabric which has been treated with a resin to make it rigid.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Figure 2:
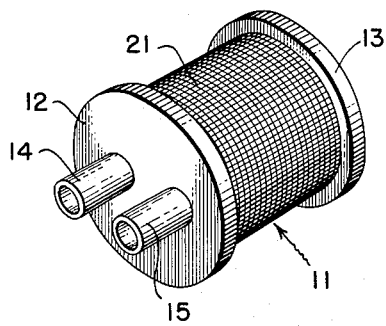
Figure 2 is a perspective view of the membrane unit.
Figure 1:
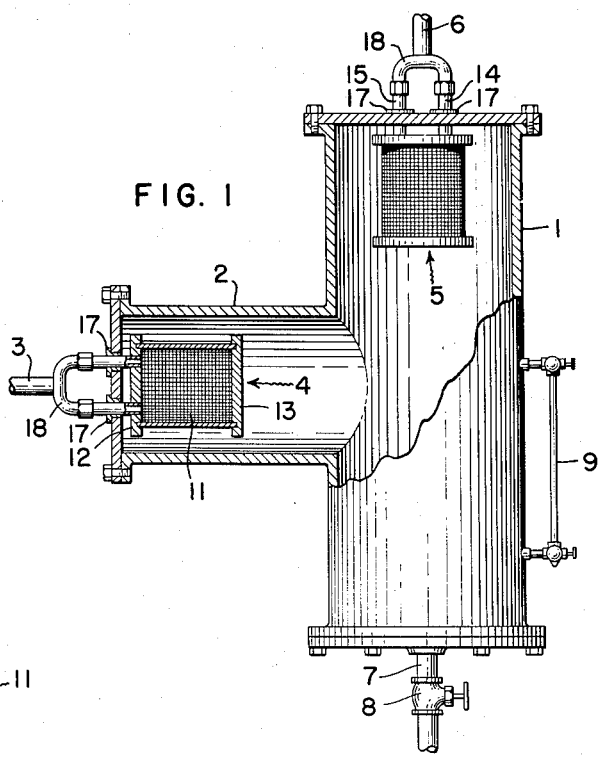
Figure 1 is a view, partly in section, of a separator.

Referring to Figure 1 of the drawing, there is shown a liquid separator of the type with which the unit of the present invention is particularly adapted to be used. The separator is of the type disclosed in Krieble application, Serial No. 31,122 filed June 4, 1948, now Patent 2,626,709, granted January 27, 1953, and includes a chamber having a vertically extending portion 1 and a horizontally extending portion 2. The mixture of liquids to be separated is introduced through an inlet 3 through which it passes to a coalescing membrane unit 4. The coalesced liquids that pass through this unit tend to separate by gravity as they travel in a horizontal path through the portion 2 of the separator and into the portion 1. The lighter liquid rises and passes through a separating unit 5 from which it goes through an outlet 6. The heavier liquid settles to the bottom of portion 1 and is discharged periodically through an outlet 7 that is controlled by a valve 8. Gauge glass 9 is provided to indicate the level of the interface between the liquids so that an operator will know when the valve 8 should be opened. If preferred, a conventional liquid level control can be used to operate the valve 8.

The filtering and coalescing or separating units 4 and 5 may be constructed in the same manner, but differ from each other in their use and in the manner in which the membranes thereof are treated. As shown herein the units are substantially oval in shape, although any desired shape could be used. It is preferred that the units have a curved surface since this is less susceptible to distortion than a flat one. Each unit includes a membrane 11 and end pieces 12 and 13. The end piece 12 is provided with a pair of inlet pipes 14 and 15, although a single larger pipe could be used if desired. It is noted that the pipes 14 and 15 pass through a plate 12 closing the end of the separator body and are secured therein by suitable unions 17. The pipes are joined by a fixture 18 with the inlet pipe 3 or with outlet pipe 6 as the case may be.

Figure 4:
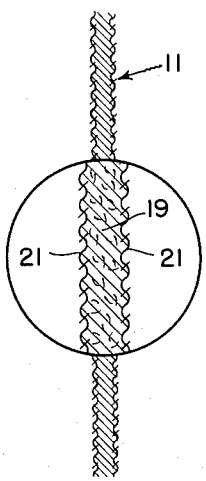
Figures 4, 5 and 6 are enlarged sections showing the construction of the membranes that are used in the unit.

The membrane 11, as shown in Figure 4, consists of a fibrous material 19 that is sandwiched between two coarse layers of fabric 21. The fibrous material is preferably made of some inorganic substance such as glass wool. This material is characterized by a natural resiliency that will prevent it from matting appreciably when it is wetted and has a multitude of pores or capillary passages through which the liquids pass in a tortuous course. At times when a relatively high pressure differential is to be impressed across the membrane, it may be desirable to spray such a mat of the desired thickness with a heat setting resin and cure it to render it semi-rigid, and thus remove any possibility of matting.

The fabric layers 21 are also preferably made of an inorganic material such as glass cloth. The mesh of this fabric is about one eighth inch, or substantially the same as ordinary wire screen. This material is thoroughly impregnated with a thermo-setting resin such as a phenolic-formaldehyde resin and cured so that it will be rigid and support the fibrous material.

In making the composite membrane, a layer of impregnated cloth 21 is wrapped around a mandrel of suitable shape in a convolution or loop. Next a layer of fibrous material 19 of desired thickness, that may or may not be sprayed with resin as desired, is placed around the layer or loop of cloth. The outer layer or loop of impregnated cloth 21 is then placed around the fibrous material. The assembly, while still on the mandrel, is heated to cure the resin, after which it is removed as a rigid, self supporting unit.

Figure 3:
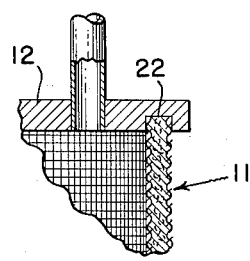
Figure 3 is a sectional detail showing the construction of the unit.

End pieces 12 and 13 are preferably made of a plastic of suitable material. The end pieces are each provided with a groove 22 which receives the end of the membrane as shown in Figures 1 and 3. When assembling the end pieces and the membrane, grooves 22 are first coated with a resin similar to that used for impregnating the cloth 21. The parts are then fitted together and heated to cure the resin. There is thus formed a substantially rigid, self-contained unit of material that has no metal or other reenforcing parts and which is inexpensive and admirably suited for its intended use.

Figure 5:
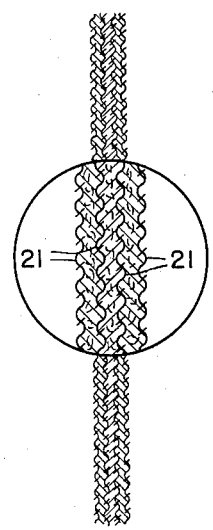

Another form in which the membrane can be made is shown in Figure 5 of the drawing. In this figure, it will be seen that there are several layers, in this case four, of the coarse meshed cloth 21 between which are the layers of the fibrous material 19. In making this type of membrane, a layer of cloth and a layer of fibrous material that have been suitably impregnated are wrapped around a mandrel in a series of loops or convolutions until a sufficient thickness or a sufficient number of layers is obtained. The material is then heated to cure the resin and thus form a rigid body. This type of membrane is more rigid than that of Figure 4 because it has a greater number of layers of cloth 21 therein. This type of membrane is used where the pressure drop through the same is larger than the pressure drop which is encountered when the membrane of the type shown in Figure 4 is used.

The efficiency of the coalescing operation in a separator is determined by the thickness of the membrane through which the liquids are passed and the size of the pores or capillary passages in it. The first of these can, of course, be varied by varying the thickness of the layer of fibrous material. The pore size may readily be varied by controlling the tightness with which the fibrous material is wrapped on the mandrel. The tighter the material is wrapped, the denser it becomes and the smaller the pore size. It has been found that a satisfactory membrane may be constructed of glass fiber approximately one-quarter of an inch in thickness and having a density or weight of three pounds per cubic foot. Such a membrane will pass 195 gallons of water per hour per square foot of membrane surface at a pressure differential of ten inches of water across the membrane.

Figure 6:
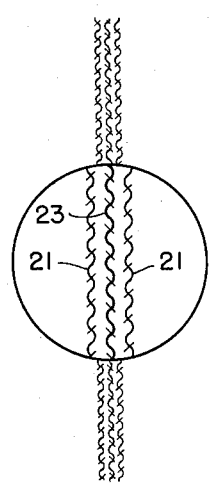

Membranes of the type described above may be used for either coalescing or separating liquids as shown at 4 and 5, respectively, in Figure 1 of the drawing. For the purpose of separating, however, it is frequently desirable to use a thinner membrane than those described above. Such a membrane is shown in Figure 6, wherein there are two layers of coarse mesh glass cloth 21 such as is used in the previously described membranes between which is placed a separating layer 23 of fine mesh glass cloth. In making a membrane unit of this type, a first layer of the impregnated cloth 21 is wrapped around a mandrel; then a layer of cloth 23 is wrapped on the mandrel, and this is followed by the outer layer 21. The assembly is then heated to cure the resin. Cloth 21 will support cloth 23.

The treatment that is given the fibrous material 19 and the cloth 23 will depend upon whether a membrane is to be used for coalescing or for separating, and upon the liquid that it is to pass. If the separator is to be used for separating a mixture of water and a hydrocarbon in which the water is the dispersed-phase, for example, the coalescing membrane can be treated, as noted above, with a phenolic-formaldehyde resin or with a heat set silicone resin, either of which will render the material water repellent. If desired, the fibrous material 19 can be impregnated with the same material. Actually, for coalescing, both liquids will pass through the membrane, and the dispersed-phase will be coalesced into larger droplets that can readily fall to the bottom of the separator. As shown in the drawing, the separator unit 5 is preferably to be constructed as shown in Figure 6 of the drawing. Since this unit is at the top of the container, which is an outlet for the lighter hydrocarbons, the fabric 23 should be treated to render it water repellent. Normally, the water will fall to the bottom of the container and be discharged through outlet 7. If desired, however, a separating membrane 23 which has been rendered hydrophillic by immersion in a solution of precipitated colloidal silica can be placed in the unit in front of the outlet 7 as shown in the above mentioned Krieble application. Whether or not such a unit is used, however, will depend upon how clean the water is to be and whether or not the hydrocarbon of the mixture is toxic.

It will be seen that the membrane units are self-sustaining and may readily be inserted in and removed from the separator. The units are inexpensive to manufacture and can be discarded when the pores thereof have become clogged. The length of time that the unit will last depends upon the cleanliness of the liquids that are being separated. Because of the fact that the fibrous material 19 has pores of capillary size, this membrane will act as a filter in addition to acting as a coalescing membrane. Therefore, its useful life will depend upon the time required for the pores to fill up with foreign material. This unit has been described as being impregnated with one particular type of resin that is chemically inert and is rigid when it has been cured. It will be obvious that there are several types of resins in use today which have the desired properties and could be used to impregnate the membrane. The choice of which resin is to be used will depend upon the liquids that are to be separated or coalesced and upon the characteristics of the liquids that the membrane must separate. While one type of end piece to close the membranes has been shown, it will readily be apparent that the ends of the membranes can be closed in other ways if it is so desired.

While in accordance with the provisions of the Statutes, I have illustrated and described the best form of embodiment of my invention now known to me it will be apparent to those skilled in the art that changes may be made in the form of the apparatus disclosed without departing from the spirit and scope of the invention as set forth in the appended claims, and that in some cases certain features of my invention may be used to advantage without a corresponding use of other features.

What is claimed is:

1. A unit for a fluid separator consisting of spaced concentric porous tubes of woven material impregnated with a thermo-setting resin, a body of glass fibers so dispersed as to be porous, and also impregnated with said resin, disposed between said tubes, said resin when heat cured forming the tubes and glass fibers into a single rigid unit.

2. A unit for a fluid separator, said unit being in tubular form and consisting of alternate layers of porous woven material impregnated with a thermo-setting resin and a body of glass fibers so arranged as to be porous and also treated with said resin, the outer layer and the inner layer of said tube being composed of said woven materials, said resin when heat cured forming the woven material and glass fibers into a single rigid unit.

References Cited in the file of this patent

UNITED STATES PATENTS

| | | |
|---|---|---|
| 1,860,111 | Miller | May 24, 1932 |
| 1,892,210 | Gordon | Dec. 27, 1932 |
| 1,912,235 | Winslow | May 30, 1933 |
| 2,141,903 | Brundage | Dec. 27, 1938 |

(Other references on following page)

UNITED STATES PATENTS

| | | |
|---|---|---|
| 2,152,901 | Manning | Apr. 4, 1939 |
| 2,266,313 | Ehlers et al. | Dec. 16, 1941 |
| 2,378,839 | Ensign et al. | June 19, 1945 |
| 2,481,949 | Richardson | Sept. 13, 1949 |
| 2,512,797 | Harvuot | June 27, 1950 |
| 2,554,748 | Lewis et al. | May 29, 1951 |
| 2,555,607 | Robinson | June 15, 1951 |
| 2,559,614 | Hapman | July 10, 1951 |
| 2,571,059 | Puschelberg et al. | Oct. 9, 1951 |
| 2,577,205 | Meyer et al. | Dec. 4, 1951 |
| 2,611,490 | Robinson | Sept. 23, 1952 |
| 2,626,709 | Krieble | Jan. 27, 1953 |
| 2,657,808 | Mankin | Nov. 3, 1953 |